United States Patent [19]
Plunkett

[11] 4,361,791
[45] Nov. 30, 1982

[54] APPARATUS FOR CONTROLLING A PWM INVERTER-PERMANENT MAGNET SYNCHRONOUS MOTOR DRIVE

[75] Inventor: Allan B. Plunkett, Scotia, N.Y.

[73] Assignee: General Electric Company, Schenectady, N.Y.

[21] Appl. No.: 262,862

[22] Filed: May 12, 1981

[51] Int. Cl.$^3$ ............................................. H02P 5/40
[52] U.S. Cl. ..................................... 318/723; 318/696; 318/808
[58] Field of Search ............... 318/696, 717, 723, 685, 318/807, 808

[56] References Cited
U.S. PATENT DOCUMENTS 4,028,600  6/1977  Blaschke et al. .................... 318/696
4,134,055  1/1979  Akamatsu ........................... 318/696
4,282,473  8/1981  Dreiseitl et al. .................... 318/803

OTHER PUBLICATIONS

Plunkett, A. B., "A Current Controlled PWM Transistor Drive" IAS Conference, Oct. 1979.

Primary Examiner—David Smith, Jr.
Attorney, Agent, or Firm—William H. Steinberg; James C. Davis, Jr.; Marvin Snyder

[57] ABSTRACT

Apparatus for controlling a permanent magnet AC synchronous motor supplied by a forced commutated inverter that does not use a mechanical shaft position sensor. A control loop regulates an inverter frequency and maintains inverter synchronism with the motor using electrical angle feedback signals developed from measured flux signals that have been phase shifted.

6 Claims, 3 Drawing Figures

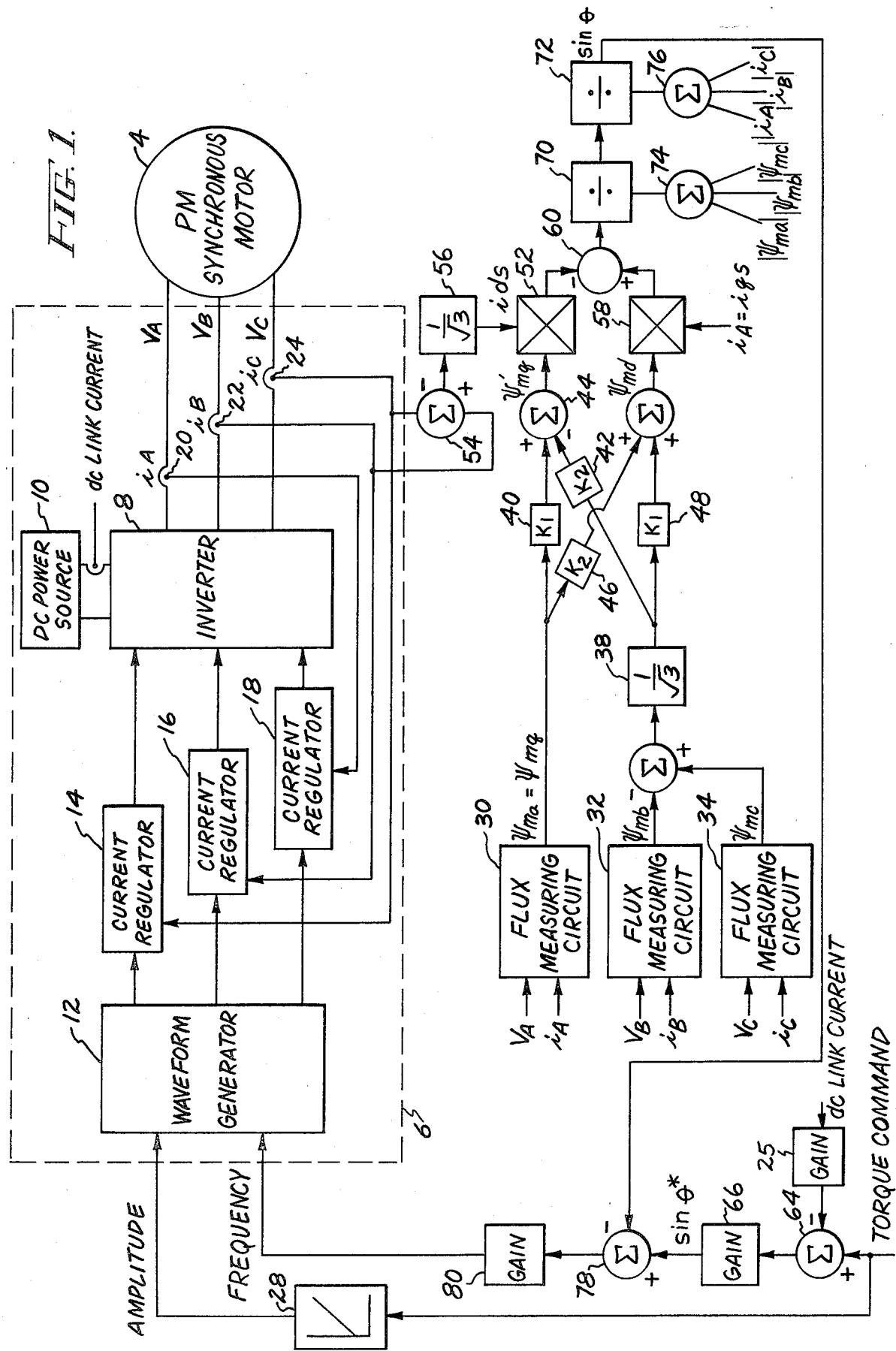

APPARATUS FOR CONTROLLING A PWM INVERTER-PERMANENT MAGNET SYNCHRONOUS MOTOR DRIVE

BACKGROUND OF THE INVENTION

This invention relates generally to apparatus for controlling a permanent magnet AC synchronous motor and more specifically the control of a permanent magnet AC synchronous motor supplied by a forced commutated inverter without the need of a mechanical shaft position sensor.

A system for controlling a permanent magnet AC synchronous motor must be adaptable to the fact that the motor field cannot be controlled and that when a force commutated inverter is used, motor operation may be in either the leading or lagging power factor made. A desirable mode of operation would be to operate with a small lagging to a small leading power factor for optimum motor efficiency. It would also be desirable to use an angle control which would eliminate the need of mechanical shaft position sensor such as the one described in U.S. Pat. No. 4,258,302, filed Sept. 28, 1979 and assigned to the General Electric Company, however, the above-mentioned angle control will operate only with leading or only with lagging power factors.

In an induction motor, the motor current always lags the voltage. Therefore, the electrical angle between the stator current and the air gap flux is always within the range of −90° to +90° with negative angles representing generating and positive angles representing motoring.

In a load commutated inverter supplying a synchronous motor the stator current must lead the voltage to maintain load commutation and therefore the motor cannot be operated in the lagging mode. The electrical angle between the stator current and the air gap flux is always greater than 90° but less than 180°.

In a permanent magnet motor with a force commutated inverter, however, if the voltage supplied by the inverter is relatively large compared to the counter emf, then the electrical angle between the stator current and the air gap flux will be less than 90°. If the inverter output voltage is lowered while maintaining the same torque output, the stator current can swing around in phase with the stator voltage and then to an electrical angle greater than 90° measured relative to the air gap flux. If the sine of the electrical angle is used as an angle feedback signal in an angle control system, having $\theta$ go from below 90° to above 90° changes the slope of the sine function making it unsuitable for use in a feedback loop. Another difficulty with a permanent magnet motor is that at higher speeds the back emf of the motor will become greater than the supplied voltage and a leading power factor will result.

It is an object of the present invention to provide a permanent magnet synchronous motor control suitable for use with a forced commutated inverter that does not need a mechanical shaft position sensor and that can control operations from no load to maximum load while adaptively controlling the motor electrical angle so that nearly unity power factor operation can be achieved.

SUMMARY OF THE INVENTION

In one embodiment of the invention, a permanent magnet synchronous motor is provided with variable frequency power from a current controlled pwm inverter. The current controlled pwm inverter has a forced commutated inverter, a plurality of current regulators, one for each phase of the motor, and a multiphase waveform generated requiring a frequency and current magnitude input. The waveform generator supplies a reference waveform to each of the current regulators, with each current regulator comparing a motor current to a corresponding reference waveform and controlling the switching of a corresponding inverter phase so that the actual current profile of the current supplied to the motor remains confined within a predetermined deadband. A control loop regulates the inverter frequency and maintains motor and inverter synchronism. A torque command is fed through a function generator to set the magnitude of a current command.

The control loop measures the motor flux phasor and rotates the motor flux phasor through a predetermined angle typically 30° so that the sine of the angle between the rotated flux phasor and a stator current phasor, which is used as an electrical angle feedback signal, remains monotonic during motor operation. The phase shift of 30° allows operation over a limited range in braking as well as nearly the full motoring range. A commanded electrical angle signal is determined from the difference between operator commanded torque and actual motor torque is compared to the electrical angle feedback signal for generating a frequency command for the waveform generator.

BRIEF DESCRIPTION OF THE DRAWING

The features of the invention believed to be novel are set forth with particularity in the appended claims. The invention itself, however, both as to organization and method of operation, together with further objects and advantages thereof, may best be understood by reference to the following description taken in conjunction with the accompanying drawing in which:

FIG. 1 is a block diagram of a control system for a synchronous permanent magnet motor supplied by a current controlled pwm inverter.

DESCRIPTION OF THE INVENTION

Figure 2A:
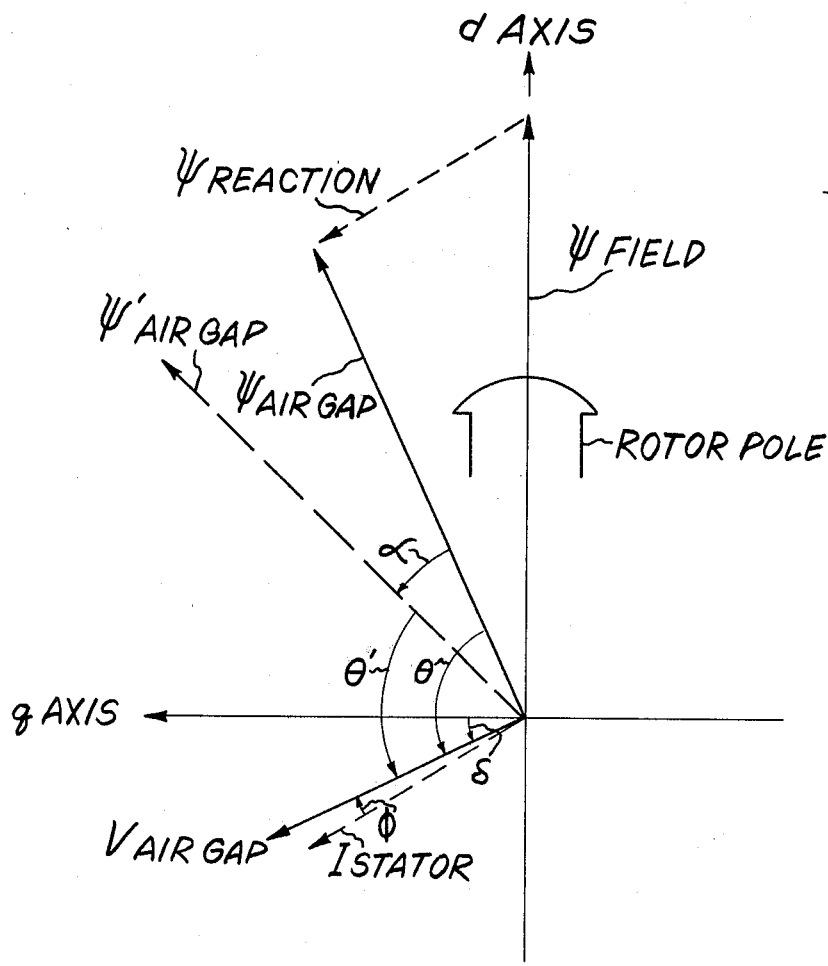
FIGS. 2A and B are phasor diagrams showing permanent magnet synchronous motor parameters for lagging and unity power factor modes of operation.
Figure 2B:
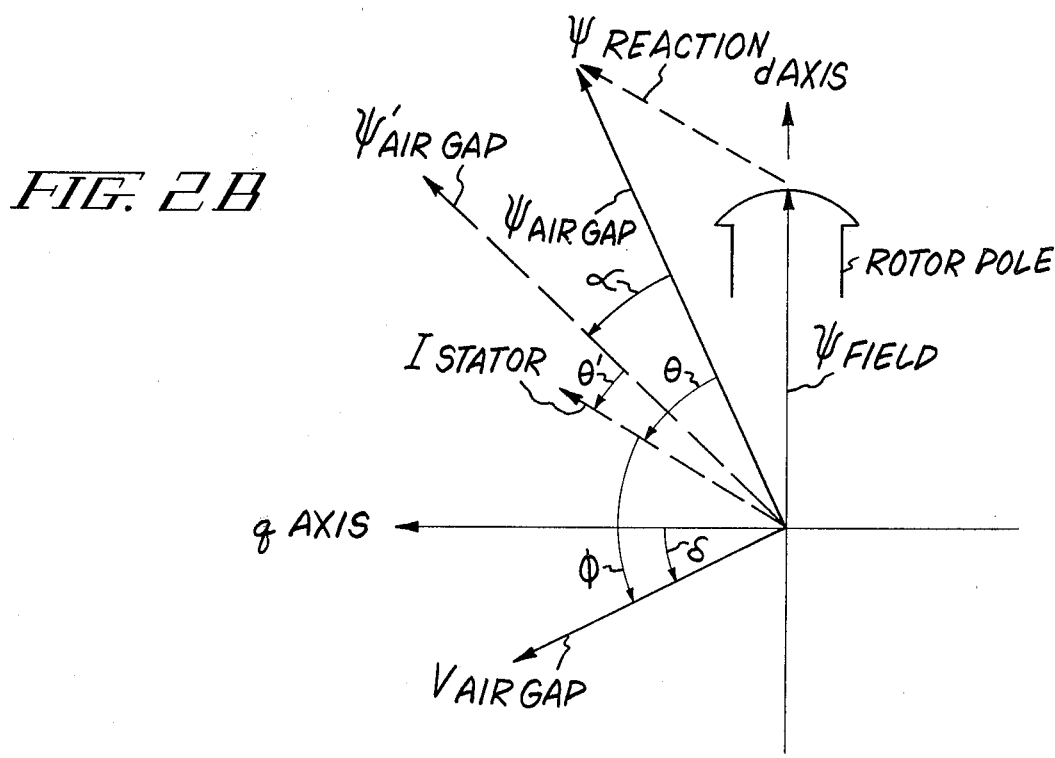

Referring to FIG. 1 a permanent magnet synchronous motor 4 is supplied with a variable frequency alternating power from a current controlled pulse width modulated inverter 6. The current controlled pulse width modulated inverter comprises a force commutated inverter 8 that is preferable transistorized, a DC power supply 10 coupled to the inverter, a waveform generator 12, and a plurality of current regulators, one for each phase of the motor. With a three phase motor as shown in the figure, the waveform generator provides three phase reference waveforms preferably sine waves at a commanded frequency and commanded current amplitude to three current regulators 14, 16 and 18. Each phase of the waveform generator is coupled to a respective one of the current regulators. The current regulators each compare a reference phase to a corresponding actual motor current obtained from one of the current sensors 20, 22 and 24 and generate control switching signals coupled to a corresponding inverter phase so that the actual current profile of the current supplied to the motor remains confined within a predetermined deadband. Each phase of the inverter is controlled independently of the others. The frequency of the inverter chopping can be controlled by introducing a small amount of hysteresis into the comparison so that in effect the amount of current ripple is regulated.

For a further, more detailed understanding of the current controlled pulse width modulated inverter, reference should be had to my copending application "Transistorized Current Controlled Pulse Width Modulated Inverter Machine Drive System", Ser. No. 80,479, filed Oct. 1, 1979 and assigned to the same assignee as the present invention. The above application is hereby incorporated by reference.

A control loop regulates inverter frequency and maintains motor synchronism by providing the frequency command to the waveform generator 12. The control loop has flux measuring circuits 30, 32 and 34 each having inputs of a motor line voltage and current. The flux measuring circuits provide an air gap flux signal for each phase that is substantially smooth, continuous, and sinusoidal. The details of the flux measuring circuit are available in my copending application "Method and Apparatus for Generating an Air-Gap Flux Signal For an AC Machine for AC Line Voltage and Current Values", Ser. No. 14,941, filed Feb. 26, 1979 and assigned to the General Electric Company. The above application is hereby incorporated by reference. Air gap flux can also be obtained by using air gap flux sensing coils. How to make the sensing coils and insert them in the motor without disturbing the main windings is explained in U.S. Pat. No. 4,011,489.

The air gap flux from each phase supplied by the flux measuring circuits is next transformed into the equivalent two phase variables along two perpendicular axis, respectively, referred to as the direct (d) axis and the quadrature (q) axis. In FIG. 1 and FIGS. 2A and B the quadrature axis is chosen to coincide with the center line of the flux belt of a phase of the stator winding on one pole of the motor rotor, and this axis is disposed 90° ahead of the (d) axis of the rotor in the forward direction of rotation. The quadrature component $\downarrow_{mq}$ of the three phase air gap flux is represented by the phase A flux signal whereas the direct axis component $\downarrow_{md}$ is obtained from the difference of the flux in phase B and phase C obtained fron summer 36 and from the application of a proportionality factor $1/\sqrt{3}$ applied in block 38.

The two phase flux feedback variables are then rotated through a predetermined angle $\alpha$. The equation for the phasor rotation which is the same equation as for a vector rotation can be presented in the vector form as follows:

$$\begin{bmatrix} \psi'_{mq} \\ \psi'_{md} \end{bmatrix} = \begin{bmatrix} \cos\alpha & -\sin\alpha \\ \sin\alpha & \cos\alpha \end{bmatrix} \begin{bmatrix} \psi_{mq} \\ \psi_{md} \end{bmatrix}$$

where $\downarrow_{mq}'$ and $\downarrow_{md}'$ are the new rotated values of the direct and quadrature flux with respect to the rotated direct and quadrature axes. $\alpha$ is the electrical angle through which the air gap flux is rotated. The quadrature axis flux obtained from flux measuring circuit 30 is multiplied by a constant $k_1$ in block 40 and the quadrature flux component $\downarrow_{mq}$ from block 38 multiplied by a constant $k_2$ in block 42. The difference between the two is obtained from summing junction 44 and is the rotated quadrature component $\downarrow_{mq}'$. The quadrature axis flux $\downarrow_{mq}$ from flux measuring circuit 30 is also multiplied by a constant $k_2$ in block 46 and added in summing junction 50 to the direct axis component of the flux B from block 38 to obtain the rotated direct axis component $\downarrow_{md}'$. As can be seen from the vector rotation equation $k_1$ equals $\cos\alpha$ and $k_2$ equals $\sin\alpha$. The rotated quadrature flux component is multiplied by the direct axis stator current component in multiplier 52. The direct axis stator current component is obtained by subtracting the line C current from the line B current in summer 54 and multiplying the difference by $1/\sqrt{3}$ block 56. The quadrature axis component, which is also the line A current, is multiplied by the rotated direct axis flux component in multiplier 58. The difference between the output of the multiplier 58 and the multiplier 52 are taken in summer 60 and the output of summer 60 is divided by the magnitude of the air gap flux in divider 70. The magnitude of the air gap flux is obtained by preforming a phasor summation and taking the absolute value of the three phase components of the flux in summer 74. The output of divider 70 is divided by the magnitude of stator current in block 72. The magnitude of the stator current is obtained by summing the line A, B and C currents in summer 76. The output of block 72 is the electrical feedback signal $\sin\theta$. $\sin\theta$ is subtracted from a commanded electrical angle signal $\sin\theta^*$. $\sin\theta^*$ is obtained from the difference between an operator torque command and actual motor torque. Actual motor torque can be obtained by feeding dc link current through gain block 25. A torque error signal is obtained by subtracting actual machine torque from operator commanded torque in summer 64. The torque error signal is fed through gain block 66 to obtain the commanded electrical angle $\sin\theta^*$.

The operator torque command is also fed to function generator 28 which may be simply a gain or scale factor with an offset to set the magnitude of the current command to the waveform generator 12.

The operation of the control system will be explained in connection with FIGS. 2A and B. Referring to FIG. 2A, the phasor diagram shows the relative position of the air gap flux phasor and the stator current phasor when the motor is operating with a unity power factor. It can be seen that $\theta$ is a slightly greater than 90° if the motor were to operate with a leading power factor, the electrical angle $\theta$ between the air gap flux phasor and the stator current phasor would clearly exceed 90° making the electrical angle feedback signal $\sin\theta$ unusable as a feedback signal because of the change of slope of the sine function creates a feedback signal that does not increase monotonically. By rotating the air gap flux phasor signal through an angle $\alpha$ the motor can be operated with both a leading power factor and with a lagging power factor as shown in FIGS. 2A and B, since the electrical angle is determined with reference to the rotated air gap flux phasor. If the air gap flux phasor was not rotated and a bias was merely added to the electrical feedback signal instead, satisfactory results would not be obtained since merely biasing the electrical angle feedback signal is a non-linear operation.

While the present invention has been described with reference to the specific embodiment thereof, it will be obvious to those skilled in the art that various changes and modifications may be made without departing from the invention's broader aspects.

What is claimed is:

1. A control system for regulating a frequency command to an alternating power source supplying a permanent magnet motor comprising:
   means for measuring the motor flux phasor;
   means for rotating said motor flux phasor through a predetermined electrical angle;
   means for generating an angle feedback signal dependent on the angle difference between the rotated flux phasor and the stator current phasor, said angle feedback signal varying monotonically during motor operation in the lagging and leading power factor mode;
   means for generating an angle command dependent on the difference between an operator commanded torque and actual machine torque; and
   means for comparing said commanded angle signal to said angle feedback signal for generating a frequency command for said alternating power source.

2. The control system of claim 1 wherein said angle feedback signal is dependent on the sine of the angle difference between the rotated flux phasor and the stator current phasor.

3. The control system of claim 1 wherein said means for rotating the motor flux through a predetermined electrical angle comprises means for transforming the air gap flux from each phase of said motor into equivalent two phase variables and rotating said two phase variables through a predetermined electrical angle.

4. A permanent magnet synchronous motor drive system comprising:
   a current controlled pulse width modulated inverter;
   a plurality of current regulators one for each motor phase;
   a multiphase waveform generator requiring a frequency command and a current magnitude command and supplying a reference waveform to each of said current regulators;
   said current regulators comparing actual motor phase current to a corresponding reference waveform and controlling the switching of a corresponding inverter phase so that the actual current profile of the current supplied to the motor remains confined within a predetermined deadband;
   control loop means for regulating said inverter frequency having means for measuring the motor flux phasor, means for rotating said motor flux phasor through a predetermined electrical angle, means for generating an angle feedback signal dependent on the angle difference between the rotated flux phasor and the stator current phasor, said angle feedback signal varying monotonically during motor operation in the lagging and leading power factor mode, means for generating an angle command dependent on the difference between operator commanded torque, means for comparing said commanded angle signal to said angle feedback signal for generating a frequency command for said waveform generator and means for generating a current magnitude command in response to said torque command to said waveform generator.

5. The drive system of claim 4 wherein said angle feedback signal is dependent on the sine of the angle difference between the rotated flux phasor and the stator current phasor.

6. The drive system of claim 4 wherein said means for rotating the motor flux through a predetermined electrical angle comprises means for transforming the air gap flux from each phase of said motor into equivalent two phase variables and rotating said two phase variables through a predetermined electrical angle.

* * * * *